UNITED STATES PATENT OFFICE.

JOSEF PERINO, OF BOSTON, MASSACHUSETTS.

FERTILIZER AND PROCESS OF PRODUCING THE SAME FROM ROCK MINERALS.

1,111,490.  Specification of Letters Patent.  Patented Sept. 22, 1914.

No Drawing.   Application filed March 20, 1914.   Serial No. 826,101.

*To all whom it may concern:*

Be it known that I, JOSEF PERINO, a subject of the Emperor of Germany, and a resident of Boston, in the county of Suffolk and State of Massachusetts, have invented certain new and useful Improvements in Fertilizer and Processes of Producing the Same from Rock Minerals, of which the following is a specification.

This invention has for its object the chemical and physical alteration of primeval rocks, which contain the mineral elements of plant food, by artificial means, so as to accomplish in a short time artificially those changes in the rocks which are performed by natural forces of water, salts and air only in the course of long periods of time. Soil is the product of such natural changes and forms the medium for bacteria and plant life. Vegetable growth is partially dependent upon the activity of certain bacteria in the soil, which change the disintegrated rock particles into soluble and available plant food. Those artificial fertilizers which have been heretofore used, neglect the natural aid of soil bacteria, and create abnormal conditions in the soil with regard to plant growth, and at the same time injure the bacteria and weaken the vigor and power of resistance of the plants themselves. A rational system of agriculture, therefore, should provide primarily the real foundation of vegetative life, as regards both the soil bacteria and the plants. Hence the main purpose of fertilizing is to counteract the impoverishment of the land by crops, by producing or maintaining artificially, according to the actual need, a soil with those properties with which nature originally provided it. This is the main object of my invention. To this end, I have invented a process which in a short time performs those rock alterations which nature accomplishes, and employ means similar to those used by nature. Nature's forces for rock disintegration are principally water, carbonic acid and salts dissolved in the infiltrating water, but these operate slowly and imperceptibly, gradually bringing about in centuries of time said alterations in the structure of minerals, as, for instance, in the various silicates, which form the general constituents of all primeval rocks and the original source of every plant food and of every efficient virgin soil.

Of special value for plant life are primarily the potash-containing primeval rocks, such as feldspar, granite, etc., and, secondarily, the non-silicates such as phosphate rocks, both of which minerals in their crude state have but a slow fertilizing effect. My process seeks to alter these minerals in one short operation into easy digestible food for bacteria and plants. This is accomplished by heating the said silicates or non-silicate rocks in the presence of certain chlorid or sulfate salts which are easily decomposed by heat at relatively low temperatures, and which by the action of both their acids and bases support and aid the disintegration of the silicates and phosphates. For instance, I may employ those salts, such as magnesium chlorid, aluminum chlorid, aluminum sulfate, etc., or mixtures of such salts, which liberate hydrochloric acid or sulfuric acid gas at a fairly low temperature below 800° C., and leave as a residue a base or basic oxid having a strong action on silicates and phosphates at still higher temperatures. Of the salts, I regard magnesium chlorid as the most useful on account of its effectiveness and cheapness, and of the value of its base, MgO, as plant food, and I shall therefore state in detail how my process may be practised by the use of this salt.

The formula of magnesium chlorid as a commercial product is $MgCl_2 + 6H_2O$. On heating this salt, it liquefies in its water and begins to decompose or dissociate into HCl,—MgO,—and $H_2O$ in a small degree at the low temperature of about 120° C., its decomposition gradually increasing as the temperature rises until about 550° to 600° C. is reached, when all the water of crystallization (partly as HCl) is driven off, one part of the chlorin being fixed in the remainder as magnesium oxychlorid. Now, by passing water steam through the mass at the last mentioned or higher temperatures, the remainder of the chlorin is liberated as hydrochloric acid gas, especially if silicates be present, in which case the silicic acid tends to combine with the magnesium oxid. The residue at last consists of pure magnesia, MgO, which as a strong base and by its special affinity to aluminium oxid ($Al_2O_3$) at higher temperatures also tends to disintegrate the silicates, after the HCl has finished its efficient work on the latter by loosening the chemical structure of their mineral elements, thus converted to a small degree into soluble salts as calcium chlorid, sodium chlorid and potassium chlorid. The addition of such bases as magnesium carbonate ($MgCO_3$) and calcium carbonate ($CaCO_3$), or other salts of the alkali and alkali earth group, may be useful for certain qualities of silicates. Furthermore, a hydration of the thus treated and transformed silicates can be performed by spreading water on the finished hot product, just enough to cool it, leaving a dry powder.

The action of the HCl and MgO and $H_2O$ upon feldspar at higher temperatures is to break up or dissociate the chemical or molecular structure in various ways according to the different chemical compositions of the feldspar; and it will be understood from what I have stated that the described process imitates the forces of nature in breaking down the rocks, but in a more effective manner by shortening the time of action,—the product being in a zeolitic state.

A further advantage of my present invention is that on account of the dissociation property of the salt used as an agent, such as magnesium chlorid, the same process can also be effectively employed for disintegrating and transforming rock phosphate, which consist principally of tricalcium phosphate. By the liberated HCl from the added $MgCl_2$ at moderate temperatures, superphosphate and calcium chlorid are produced at first, as will be readily conceived. A special feature, however, in this case is that at higher rising temperatures the first-produced acid phosphate reacts on calcium chlorid in again liberating hydrochloric acid and forming either reverted phosphate, or restoring neutral phosphate of an apatitic nature, simultaneously transforming it into a very finely divided reaction product in proper condition for food for bacteria and plants.

In carrying out my process, the finely ground silicate rock, for instance feldspar, or rock phosphate, or a mixture of both, together with an equivalent quantity of salt, such as magnesium chlorid, is placed in a rotary kiln or suitable furnace and heated by water gas or other fuel, the temperature being regulated and gradually raised to approximately 850° to 950° C., but not to such a point to fuse the minerals, and the mixture is fed through the kiln through increasing temperatures and then discharged.

I prefer to use water gas as the fuel, as the carbonic acid and steam are thus created in a simple way for supporting the work of disintegration by HCl and MgO. The steam and carbon dioxid play a part in the process of molecular disintegration in some of the reactions. For instance, if oxychlorid of magnesium ($MgOCl_2$) be formed at the higher temperatures, the water will decompose it completely to MgO and HCl. The action of the carbon dioxid upon the silicates is similar, though in a smaller degree, to that of the HCl. In the event that water gas be not used as a fuel, exhaust steam may be supplied to the kiln, or, as will be subsequently explained, steam from another source may be employed. Magnesium chlorid, as used, has a further advantage because soluble magnesium salts, contained even in traces in the water which infiltrates rocks, tend to replace lime, soda and potash by magnesia and lead to a steatitic change.

Preferably, in manufacturing commercial fertilizer, I heat a mixture of finely ground silicate rock and phosphate rock with the magnesium chlorid, so that, after the hydrochloric acid partly has acted upon the rock phosphate and has been liberated again as explained, it is able to perform a second action upon the silicates. As an example of the process, I may state the following:— Finely ground silicates (feldspar or the like) are mixed with finely ground phosphate rock (in the proportion to meet the practical need), and then I mix therewith magnesium chlorid, powdered, more or less dehydrated, or in solution, in the proportion of about 3 to 5 parts of the rock mixture to 1 part of the chlorid. The whole mixture is then passed through a rotary kiln or other suitable furnace, in the direction of the rising temperatures, so that the charge is heated to a fairly strong red heat (and further to a bright red heat if needed, i. e., 850° to 950° C.). For special purposes the heat may be higher or lower, although I prefer not to have a heat which will fuse the mineral content of the rock. After the material has been so treated and then discharged, it is preferably quickly cooled by spraying with cold water leaving a dry powder, at the same time hydrating the disintegrated silicates to a certain degree to produce a zeolitic state. The escaping steam may be utilized in producing the water gas which is used as fuel for the furnace, or delivered directly to the furnace if other fuel be used. If desired, the step of treating the disintegrated product with water may be omitted, and the product cooled in any suitable manner.

It will be apparent that there will escape from the kiln or furnace a certain amount of free HCl. This may be absorbed by crude magnesite to reproduce magnesium chlorid for use in the kiln. I should not consider it a departure from my invention if magnesite or dolomite (magnesian limestone) added to the mixture of rock minerals were fed into the receiving end of the kiln and HCl also introduced or any other means were used, for instance, ammonium chlorid ($NH_4Cl$) to form $MgCl_2$ directly therein, instead of supplying the chlorid as such thereto. The $MgCl_2$ also may be supplemented by any suitable alkali or alkali-earth salt, or partly replaced by other salts with similar properties concerning dissociation and action on silicates and phosphates under such conditions as described,—for instance, $Al_2Cl_6$, $Al_2(SO_4)_3$ or mixtures of same with others such as $CaCl_2$ (or KCl)+$Al_2(SO_4)_3$ as alunite.

A fertilizer produced as described can be mixed to advantage with any other suitable fertilizing material such as cyanamid, humus, etc., or with bacteria cultures, thus permitting the production of a standard fertilizer of universal applicability for the betterment of any kind of soil.

What I claim is:—

1. A commercial fertilizer composed of a chemically-prepared intimate mixture of potash-containing silicate rock in a zeolitic state and rock phosphate converted into the form of a finely-divided neutral reaction product.

2. The herein described process of making a commercial fertilizer which consists in adding to and mixing with finely ground rock containing plant food, a salt of a strong mineral acid, said salt capable of dissociation into its acid and base below the temperature of 800° C., and then gradually heating said mixture to an elevated temperature in the presence of steam under atmospheric pressure, thereby dissociating said salt and unlocking the chemical and physical structure of said rock without changing materially the characteristic components of said rock.

3. The herein described process of making a commercial fertilizer which consists in adding to and mixing with finely ground rock containing plant food, a salt of a strong mineral acid capable of dissociation into its acid and base below the temperature of 800° C., gradually heating such mixture to an elevated temperature in the presence of steam under atmospheric pressure, thereby disintegrating said rock by the products of dissociation of said salt aided by steam, and treating the product of disintegration with sufficient water to cool and hydrate the same and leave a dry powder.

4. The herein described process of making a commercial fertilizer which consists in gradually heating to an elevated temperature, a mixture of finely ground potash-containing silicate rock, rock phosphate and a salt of a strong mineral acid capable of dissociation into its acid and base below the temperature of 800° C., thereby disintegrating said rocks by the products of dissociation of said salt.

5. The herein described process of making a commercial fertilizer which consists in gradually heating to an elevated temperature a mixture of finely ground potash-containing silicate rock, rock phosphate and a salt of a strong mineral acid capable of dissociation into its acid and base below the temperature of 800° C., thereby disintegrating said rocks by the products of dissociation of said salt aided by steam under atmospheric pressure.

6. The herein described process of making a commercial fertilizer which consists in gradually heating to an elevated temperature a mixture of finely ground potash containing silicate rock, rock phosphate and a salt of a strong mineral acid capable of dissociation into its acid and base below the temperature of 800° C., thereby disintegrating said rocks by the products of dissociation of said salt aided by steam under atmospheric pressure, and treating the product of disintegration with sufficient water to cool and hydrate the same and leave a dry powder.

7. The herein described process of making a commercial fertilizer which consists in gradually heating a mixture of finely ground potash-containing silicate rock, rock phosphate and magnesium chlorid to an elevated temperature, thereby disintegrating said rocks by the products of dissociation, acid and base, of said chlorid.

8. The herein described process of making a commercial fertilizer which consists in gradually heating a mixture of finely ground potash-containing silicate rock, rock phosphate and magnesium chlorid to an elevated temperature in the presence of steam under atmospheric pressure, thereby disintegrating said rocks by the products of dissociation, acid and base, of said chlorid aided by said steam.

9. The herein described process of making a commercial fertilizer which consists in gradually heating a mixture of finely ground potash-containing silicate rock, rock phosphate and magnesium chlorid to an elevated temperature in the presence of steam under atmospheric pressure, thereby disintegrating said rocks by the products of dissociation, acid and base, of said chlorid aided by said steam, and treating the product of disintegration with sufficient water to cool and hydrate the same and leave a dry powder.

In testimony whereof I have affixed my signature, in presence of two witnesses.

JOSEF PERINO.

Witnesses:
 Marcus B. May,
 Germanus E. Perino.